US012188390B2

(12) United States Patent
Usui

(10) Patent No.: US 12,188,390 B2
(45) Date of Patent: Jan. 7, 2025

(54) DIAGNOSIS DEVICE AND DIAGNOSIS METHOD

(71) Applicant: ISUZU MOTORS LIMITED, Tokyo (JP)

(72) Inventor: Toshiyuki Usui, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 154 days.

(21) Appl. No.: 17/802,891

(22) PCT Filed: Feb. 25, 2021

(86) PCT No.: PCT/JP2021/007159
§ 371 (c)(1),
(2) Date: Aug. 26, 2022

(87) PCT Pub. No.: WO2021/172450
PCT Pub. Date: Sep. 2, 2021

(65) Prior Publication Data
US 2023/0141389 A1 May 11, 2023

(30) Foreign Application Priority Data

Feb. 28, 2020 (JP) ................................. 2020-033206

(51) Int. Cl.
*F01N 11/00* (2006.01)
(52) U.S. Cl.
CPC ........ *F01N 11/002* (2013.01); *F01N 2550/02* (2013.01)
(58) Field of Classification Search
CPC .............. F01N 11/002; F01N 2550/02; F01D 41/1458; F01D 41/1492; F01D 41/263; F01D 41/447
See application file for complete search history.

(56) References Cited

U.S. PATENT DOCUMENTS 6,164,063 A * 12/2000 Mendler ............... F01N 3/2882
60/297
2002/0127151 A1 * 9/2002 Takeshima ......... B01D 53/9431
422/107
(Continued)

FOREIGN PATENT DOCUMENTS

JP 2008-274835 A 11/2008
JP 2009-097491 A 5/2009
(Continued)

OTHER PUBLICATIONS

Patent Cooperation Treaty, International Search Report, Application No. PCT/JP2021/007159, dated Apr. 20, 2021, in 5 pages.
(Continued)

*Primary Examiner* — John Kwon
(74) *Attorney, Agent, or Firm* — PROCOPIO, CORY, HARGREAVES & SAVITCH LLP

(57) ABSTRACT

A management device 100 includes: a data acquisition unit 122 configured to acquire cumulative data for each parameter related to stress acting on a DOC 33 configured to purify exhaust gas of an engine and an exhaust gas temperature of the exhaust gas raised for purification; a damage degree identification unit 123 configured to identify a degree of damage to the DOC 33 based on the acquired cumulative data; a relationship identification unit 124 configured to identify a relational expression indicating a relationship between the identified degree of damage and the exhaust gas temperature; an target information acquisition unit 125 configured to acquire an exhaust gas temperature of exhaust gas raised for purification performed by the DOC 33; and a diagnosis unit 126 configured to estimate a degree of damage to the DOC 33 based on the acquired exhaust gas temperature and the identified relational expression.

5 Claims, 5 Drawing Sheets

(56) References Cited

U.S. PATENT DOCUMENTS

| | | |
|---|---|---|
| 2008/0264037 A1 | 10/2008 | Takahashi et al. |
| 2019/0186399 A1* | 6/2019 | Takada ................ F02D 41/222 |
| 2020/0173386 A1 | 6/2020 | Kiuchi |
| 2023/0141389 A1* | 5/2023 | Usui .................. F02D 41/1446 |
| | | 701/99 |
| 2023/0203979 A1* | 6/2023 | Ishikawa ............... B60W 10/08 |
| | | 60/320 |

FOREIGN PATENT DOCUMENTS

| | | |
|---|---|---|
| JP | 2014-156807 A | 8/2014 |
| JP | 2017-048744 A | 3/2017 |
| JP | 2018-193953 A | 12/2018 |

OTHER PUBLICATIONS

Patent Cooperation Treaty, WOSA, Application No. PCT/JP2021/007159, dated Apr. 20, 2021, in 4 pages.

* cited by examiner

DIAGNOSIS DEVICE AND DIAGNOSIS METHOD

CROSS-REFERENCE TO RELATED APPLICATIONS

This application is US National Stage of International Patent Application PCT/JP2021/007159, filed Feb. 25, 2021, which claims benefit of priority from Japanese Patent Application JP2020-033206, filed Feb. 28, 2020, the contents of both of which are incorporated herein by reference.

TECHNICAL FIELD

The present disclosure relates to a diagnosis device and a diagnosis method.

BACKGROUND ART

Some vehicles are provided with a purification device that purifies exhaust gas in an exhaust passage of an internal combustion engine. The purification device includes a diesel oxidation catalyst (DOC), which is an oxidation catalyst, and a catalyzed soot filter (CSF), raises a temperature of the exhaust gas, and burns and removes particulate matter (PM) in the exhaust gas (so-called regeneration control).

CITATION LIST

Patent Literature

Patent Literature 1: JP-A-2018-193953

SUMMARY OF INVENTION

Technical Problem

For example, when the purification device is provided upstream in the exhaust passage, the particulate matter (for example, soot) in the exhaust gas may adhere to the DOC and block the DOC. When the DOC is blocked, a flow of the exhaust gas deteriorates, and the above-described regeneration control is not smoothly executed. Therefore, it is required to appropriately estimate a degree of damage to the purification device and perform maintenance or the like.

The present disclosure has been made in view of these points, and an object of the present disclosure is to appropriately estimate a degree of damage to a purification device.

Solution to Problem

A first aspect of the present disclosure provides a diagnosis device. The diagnosis device includes: an acquisition unit configured to acquire, from a plurality of internal combustion engine devices, cumulative data for each parameter related to stress acting on a purification device configured to purify exhaust gas of an internal combustion engine and an exhaust gas temperature of the exhaust gas raised for purification; a damage degree identification unit configured to identify a degree of damage to the purification device based on the acquired cumulative data; a relationship identification unit configured to identify a relational expression indicating a relationship between the identified degree of damage and the exhaust gas temperature; an exhaust gas temperature acquisition unit configured to acquire an exhaust gas temperature of exhaust gas raised for purification performed by the purification device from a target device which is an internal combustion engine device to be diagnosed; and an estimation unit configured to estimate a degree of damage to the purification device of the target device based on the exhaust gas temperature of the target device acquired by the exhaust gas temperature acquisition unit and the relational expression identified by the relationship identification unit.

The estimation unit may estimate a degree of damage to an oxidation catalyst for purifying particulate matter as the degree of damage to the purification device.

The exhaust gas temperature acquisition unit may acquire a first temperature which is an upstream exhaust gas temperature of the oxidation catalyst, and a second temperature which is a downstream exhaust gas temperature of the oxidation catalyst, and the estimation unit may estimate the degree of damage to the oxidation catalyst based on a temperature difference between the first temperature and the second temperature and the relational expression.

The damage degree identification unit may identify the degree of damage according to cumulative data of each of a plurality of stress factors deteriorating the purification device.

A second aspect of the present disclosure provides a diagnosis method. The diagnosis method includes: a step of acquiring, from a plurality of internal combustion engine devices, cumulative data for each parameter related to stress acting on a purification device configured to purify exhaust gas of an internal combustion engine and an exhaust gas temperature of the exhaust gas raised for purification; a step of identifying a degree of damage to the purification device based on the acquired cumulative data; a step of identifying a relational expression indicating a relationship between the identified degree of damage and the exhaust gas temperature; a step of acquiring an exhaust gas temperature of exhaust gas raised for purification performed by the purification device from a target device which is an internal combustion engine device to be diagnosed; and a step of estimating a degree of damage to the purification device of the target device based on the acquired exhaust gas temperature of the target device and the identified relational expression.

Advantageous Effects of Invention

According to the present disclosure, it is possible to appropriately estimate a degree of damage to a purification device.

DESCRIPTION OF EMBODIMENTS

<Overview of Vehicle Management System>

An overview of a vehicle management system according to an embodiment will be described with reference to FIG. 1.

Figure 1:
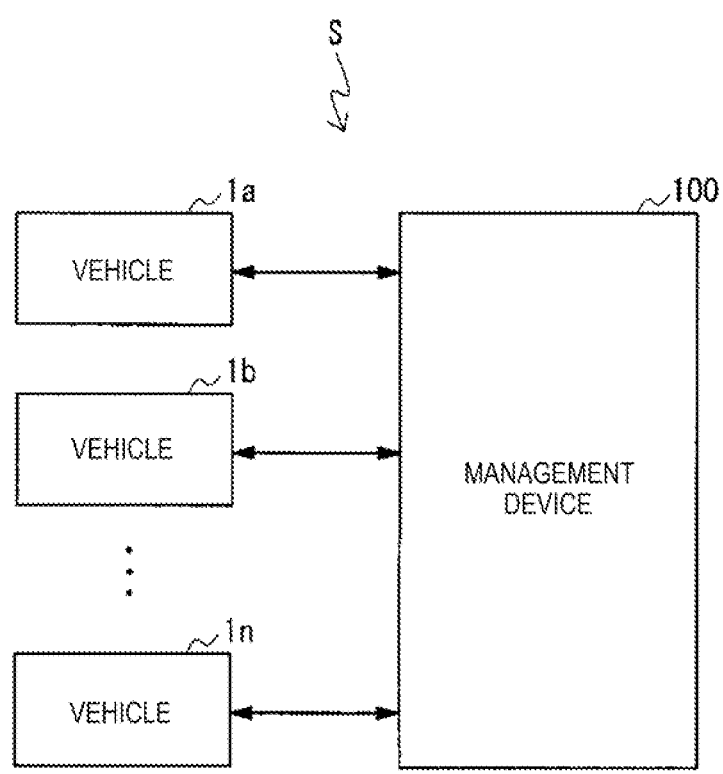
FIG. 1 is a schematic diagram showing an overview of a vehicle management system S.

FIG. 1 is a schematic diagram showing an overview of a vehicle management system S. The vehicle management system S is a system configured to manage states of a plurality of vehicles 1a, 1b, . . . , 1n (hereinafter, also collectively referred to as "vehicles 1") by operating a management device 100 and the vehicles 1 in cooperation with each other.

The plurality of vehicles 1 are, for example, trucks. The vehicle 1 corresponds to an internal combustion engine device including an engine which is an internal combustion engine. The vehicle 1 is provided with a sensor or the like configured to measure a state of the own vehicle, and transmits measured data to the management device 100.

The management device 100 is a vehicle management device capable of communicating with the plurality of vehicles 1 and configured to manage the vehicles 1. The management device 100 is, for example, a server provided in a management center. The management device 100 receives data (such as cumulative data to be described later) from each vehicle 1. The management device 100 diagnoses the state of the vehicle 1 using the received data. For example, the management device 100 determines whether maintenance is necessary based on a diagnosis result.

<Configuration of Vehicle>

Configurations of the plurality of vehicles 1a, 1b, . . . , 1n shown in FIG. 1 are the same. The configuration of the vehicle 1 will be described with reference to FIG. 2. Hereinafter, a configuration related to the diagnosis of the vehicle 1 will be described.

Figure 2:
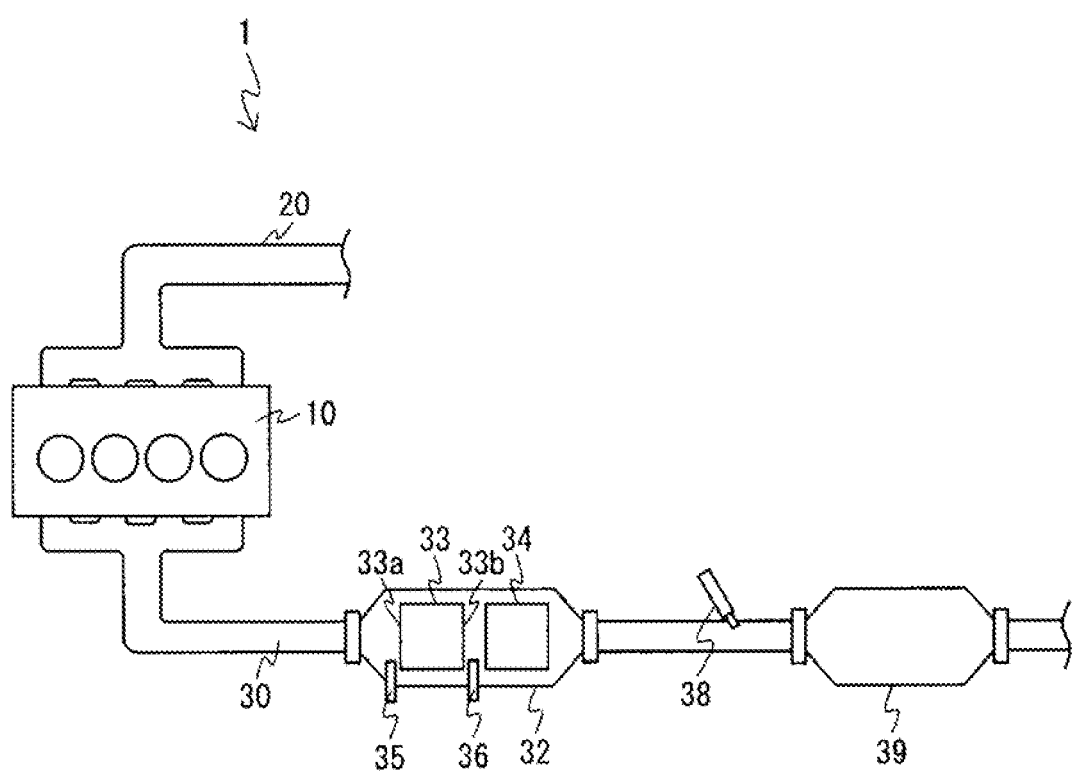
FIG. 2 is a schematic diagram showing a configuration of a vehicle 1.

FIG. 2 is a schematic diagram showing the configuration of the vehicle 1. As shown in FIG. 2, the vehicle 1 includes an engine 10, an intake passage 20, an exhaust passage 30, a diesel particulate defuser (DPD) 32, an injection unit 38, and a selective catalytic reduction (SCR) 39.

The engine 10 burns and expands an air-fuel mixture of fuel and intake air injected into a cylinder (a combustion chamber) to generate power. In the engine 10, the intake air is suctioned into the cylinder, and exhaust gas after combustion is discharged from the cylinder.

The intake passage 20 is a passage through which the intake air flows toward the engine 10. The intake passage 20 is provided with a supercharger configured to supercharge the intake air.

The exhaust passage 30 is a passage through which the exhaust gas from the engine 10 flows. The exhaust passage 30 is provided with a DPD 32, the injection unit 38, and an SCR 39.

The DPD 32 is a purification device configured to remove particulate matter (for example, soot) in the exhaust gas. When a predetermined amount of particulate matter is accumulated in the filter, the DPD 32 performs regeneration (combustion) processing to remove the particulate matter. The DPD 32 includes a DOC 33, a CSF 34, and temperature sensors 35, 36.

The DOC 33 is a diesel oxidation catalyst, and efficiently oxidizes hydrocarbon of the exhaust gas to raise a temperature of the exhaust gas. When the temperature of the exhaust gas rises, the combustion of the particulate matter during the regeneration processing is promoted. The DOC 33 has a so-called honeycomb structure.

The CSF 34 is a filter configured to collect the particulate matter in the exhaust gas.

The temperature sensor 35 is provided on a front surface 33a side of the DOC 33, and is configured to detect the temperature of the exhaust gas before flowing into the DOC 33.

The temperature sensor 36 is provided on a rear surface 33b side of the DOC 33, and is configured to detect the temperature of the exhaust gas flowing out of the DOC 33.

The injection unit 38 injects urea water, which is a precursor of ammonia, into the exhaust gas in the exhaust passage 30.

The SCR 39 is a purification device configured to reduce NOx in the exhaust gas. The SCR 39 causes NOx and ammonia to react with each other to reduce NOx and ammonia to harmless nitrogen and water.

The particulate matter (for example, soot) in the exhaust gas may adhere to a front surface 33a of the DOC 33 and block the DOC 33. When a degree of blockage (a degree of damage) of the DOC 33 is large, the flow of the exhaust gas deteriorates, and the regeneration processing cannot be performed smoothly. When the DOC 33 is blocked, a temperature inside the CSF 34 may also rise, and the CSF 34 may deteriorate.

On the other hand, the management device 100 acquires cumulative data indicating operation states from the plurality of vehicles 1, and obtains a relational expression between the degree of damage to the DOC 33 and a characteristic value (specifically, the temperature of the exhaust gas) for identifying the damage. Then, the management device 100 estimates the degree of damage to the DOC 33 of the vehicle 1 to be diagnosed based on the relational expression obtained in advance and an exhaust gas temperature acquired from the vehicle 1 to be diagnosed. Accordingly, it is possible to appropriately estimate the degree of damage to the DOC 33 of the vehicle 1 to be diagnosed.

<Configuration of Management Device>

A configuration of the management device 100 that functions as a diagnosis device will be described with reference to FIG. 3.

Figure 3:
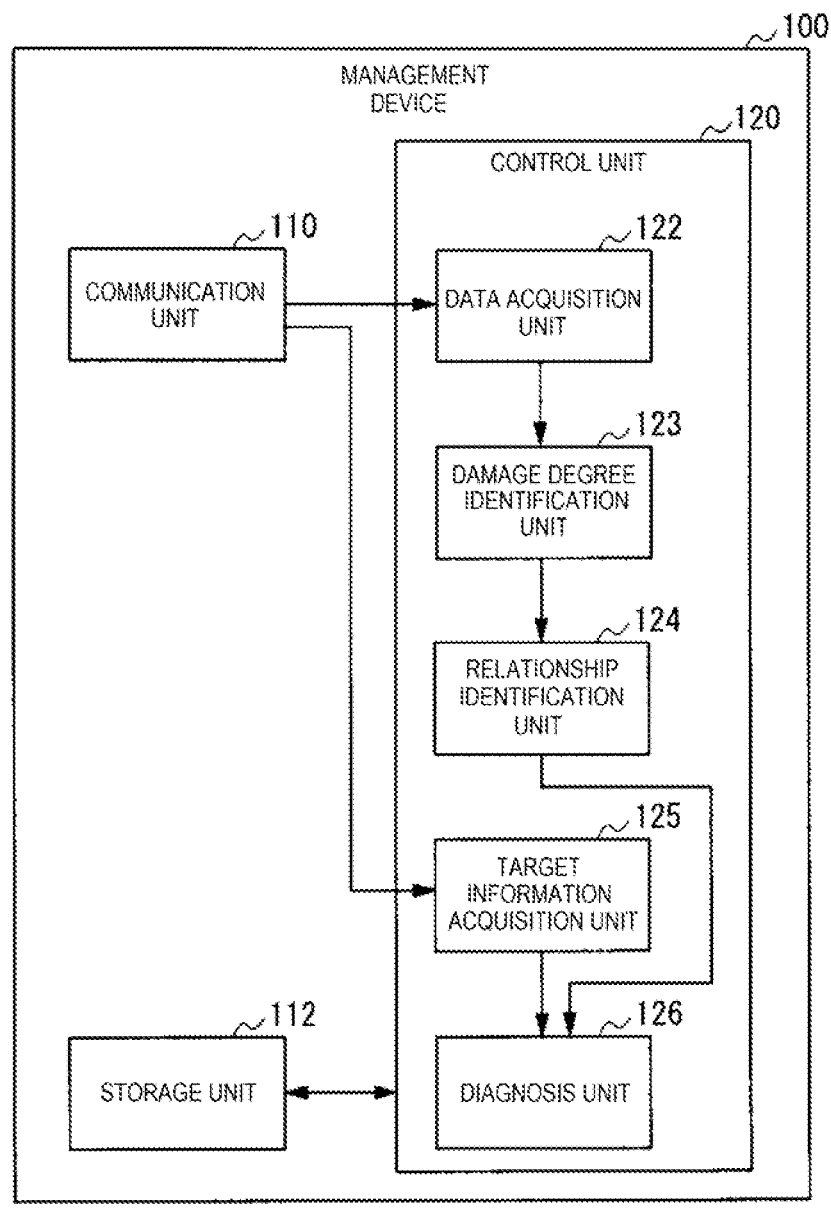
FIG. 3 is a block diagram showing a configuration of a management device 100.

FIG. 3 is a block diagram showing the configuration of the management device 100. The management device 100 is operated by an administrator of the management center. As shown in FIG. 3, the management device 100 includes a communication unit 110, a storage unit 112, and a control unit 120.

The communication unit 110 is configured to communicate with the vehicle 1 (FIG. 1). The communication unit 110 is configured to transmit and receive data to and from the vehicle 1. For example, the communication unit 110 receives the cumulative data indicating the operation state of the vehicle 1 from the vehicle 1.

The storage unit 112 includes, for example, a read only memory (ROM) and a random access memory (RAM). The storage unit 112 is configured to store a program to be executed by the control unit 120 and various types of data. For example, the storage unit 112 stores the cumulative data acquired from each of the plurality of vehicles 1. Further, the storage unit 112 is configured to store information on the relational expression of the degree of damage to the DOC 33.

The control unit 120 is, for example, a central processing unit (CPU). The control unit 120 is configured to diagnose the vehicle 1 by executing the program stored in the storage unit 112. In the present embodiment, the control unit 120 functions as a data acquisition unit 122, a damage degree identification unit 123, a relationship identification unit 124, a target information acquisition unit 125, and a diagnosis unit 126.

The data acquisition unit 122 is configured to acquire data of the vehicle 1 from the plurality of vehicles 1. In the present embodiment, the data acquisition unit 122 acquires cumulative data for each parameter related to stress acting on the DPD 32 (here, the DOC 33) from the plurality of vehicles 1. By using the cumulative data, it is possible to diagnose the degree of damage to the DOC 33 that has deteriorated due to the complex stress. The data acquisition unit 122 periodically (for example, once per month) acquires the cumulative data. The data acquisition unit 122 stores the acquired cumulative data in the storage unit 112.

There are a plurality of parameters of stress factors acting on the DOC 33. For example, the parameters of stress factors are use in an operating region in which soot is likely to be generated, use in a state in which the exhaust gas is at a low temperature, use in a state in which a flow rate of the exhaust gas is low, and the like. The cumulative data indicates a frequency of each parameter.

The data acquisition unit 122 acquires the exhaust gas temperature of the exhaust gas raised for purification together with the cumulative data from the plurality of vehicles 1. That is, the data acquisition unit 122 acquires the exhaust gas temperature during the regeneration processing. Here, the data acquisition unit 122 acquires the exhaust gas temperature detected by the temperature sensors 35, 36 during the regeneration processing. The exhaust gas temperature of the exhaust gas is a characteristic value capable of identifying the degree of damage to the deteriorated DOC 33. Normally, when the exhaust gas temperature is high, the degree of damage to the DOC 33 tends to be small, and when the exhaust gas temperature is low, the degree of damage to the DOC 33 tends to be large.

The damage degree identification unit 123 is configured to identify the degree of damage to the DPD 32 (here, the DOC 33) of the vehicle 1. The damage degree identification unit 123 identifies the degree of damage to the DOC 33 of each vehicle 1 based on the cumulative data acquired from the plurality of vehicles 1. That is, the damage degree identification unit 123 identifies a degree of clogging of the front surface of the DOC 33 due to a plurality of stress factors.

The damage degree identification unit 123 identifies the degree of damage according to the cumulative data of each of the plurality of stress factors deteriorating the DOC 33. At this time, the damage degree identification unit 123 multiplies a weighting coefficient for each stress factor. Accordingly, it is possible to identify the degree of damage reflecting the plurality of stress factors.

The relationship identification unit 124 is configured to identify a relational expression indicating a relationship between the degree of damage to the DOC 33 and a characteristic value for identifying the damage. That is, the relationship identification unit 124 is configured to identify a relational expression indicating the relationship between the degree of damage to the DOC 33 identified by the damage degree identification unit 123 and the exhaust gas temperature during the regeneration processing for identifying the damage. The relationship identification unit 124 stores the identified relational expression in the storage unit 112.

Figure 4:
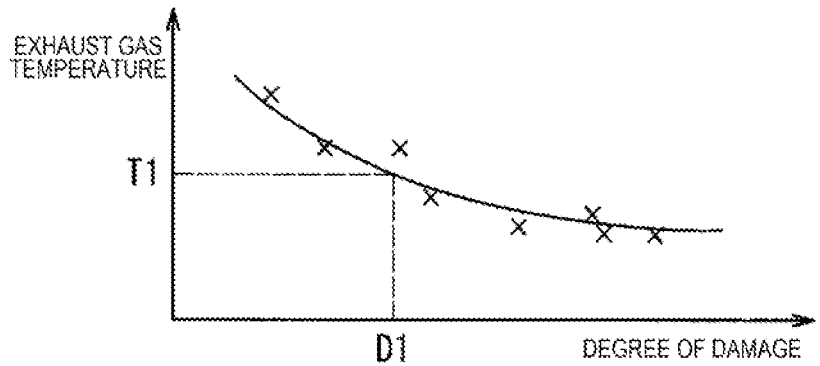
FIG. 4 is a schematic diagram showing a relational expression.

FIG. 4 is a schematic diagram showing the relational expression. In a graph in FIG. 4, a horizontal axis represents the degree of damage to the DOC 33, and a vertical axis represents the exhaust gas temperature which is the characteristic value. In the graph, the correspondence relationship between the degree of damage and the characteristic value based on the data periodically acquired from the one vehicle 1, which is a failed vehicle, is plotted as a x mark. A curve on the graph is an approximate line of plotted data, and indicates the relational expression. The relationship identification unit 124 may identify the relational expression by averaging the approximate lines obtained for each of the plurality of vehicles 1.

The relationship identification unit 124 may update the relational expression by machine learning. That is, the relationship is updated using the cumulative data and the exhaust gas temperature that are periodically acquired from the vehicle 1. Accordingly, it is possible to identify the relational expression with higher accuracy.

The target information acquisition unit 125 is configured to acquire, from the vehicle 1 to be diagnosed, information on the characteristic value (here, the exhaust gas temperature) for identifying the degree of damage to the DOC 33. That is, the target information acquisition unit 125 functions as an exhaust gas temperature acquisition unit configured to acquire the exhaust gas temperature of the exhaust gas raised for the regeneration processing. When the device to be diagnosed is the vehicle 1a shown in FIG. 1, the target information acquisition unit 125 acquires the exhaust gas temperature from the vehicle 1a.

The target information acquisition unit 125 acquires an upstream temperature which is the upstream exhaust gas temperature of the DOC 33, and a downstream temperature which is the downstream exhaust gas temperature of the DOC 33. The upstream exhaust gas temperature is the temperature detected by the temperature sensor 35 (FIG. 2), and the downstream exhaust gas temperature is the temperature detected by the temperature sensor 36. The target information acquisition unit 125 obtains a temperature difference between the upstream exhaust gas temperature and the downstream exhaust gas temperature. The target information acquisition unit 125 outputs information on the obtained temperature difference to the diagnosis unit 126.

The diagnosis unit 126 is configured to diagnose the vehicle 1 to be diagnosed. The diagnosis unit 126 functions as an estimation unit configured to estimate the degree of damage to the DOC 33 to be diagnosed based on the exhaust gas temperature acquired by the target information acquisition unit 125 and the relational expression identified by the relationship identification unit 124. Specifically, the diagnosis unit 126 estimates the degree of damage to the DOC 33 to be diagnosed by applying the exhaust gas temperature during the regeneration processing to the relational expression. Accordingly, if the temperature difference during the regeneration processing is known, the diagnosis unit 126 can accurately estimate the degree of damage (the degree of clogging of the front surface of the DOC 33) to the DOC 33 that deteriorates due to the plurality of stress factors.

The diagnosis unit 126 estimates the degree of damage to the DOC 33 based on the temperature difference between the upstream temperature and the downstream temperature of the DOC 33 and the relational expression. For example, as shown in FIG. 4, when the temperature difference is T1, the diagnosis unit 126 estimates that the degree of damage is D1. The diagnosis unit 126 may predict a life of the DOC 33 based on the estimated degree of damage to the DOC 33.

<Flow of Processing Executed by Management Device>

A flow of the diagnosis processing executed by the management device 100 will be described with reference to FIGS. 5 and 6.

Figure 5:
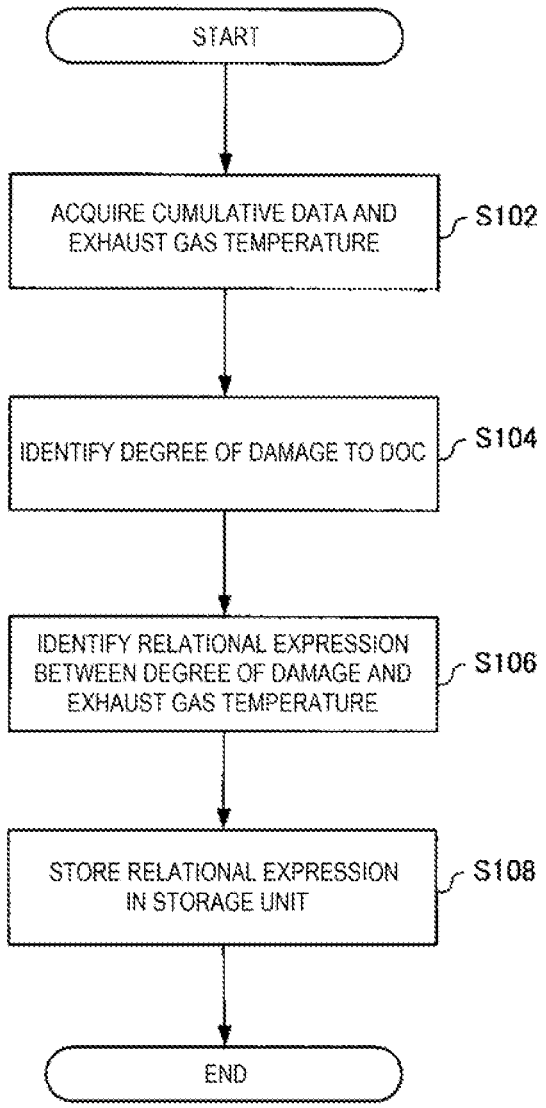
FIG. 5 is a flowchart showing a flow for identifying the relational expression.

FIG. 5 is a flowchart showing the flow for identifying the relational expression.

The data acquisition unit 122 of the management device 100 acquires the cumulative data and the exhaust gas temperature from the plurality of vehicles 1 (for example, the vehicles 1a to 1n in FIG. 1) (step S102). The data acquisition unit 122 periodically (for example, once per month) acquires the cumulative data and the exhaust gas temperature.

Next, the damage degree identification unit 123 identifies the degree of damage to the DOC 33 of each vehicle 1 based on the acquired cumulative data (step S104). That is, the damage degree identification unit 123 identifies the degree of damage to the DOC 33 that deteriorates due to the plurality of stress factors.

Next, the relationship identification unit 124 identifies the relational expression indicating the relationship between the identified degree of damage and the exhaust gas temperature (step S106). For example, the relationship identification unit 124 identifies the relational expression indicated by an approximate expression shown in FIG. 4.

Next, the relationship identification unit 124 stores the identified relational expression in the storage unit 112 (step S108). By repeating the above-described processing, the relational expression stored in the storage unit 112 is updated. The relational expression with high accuracy can be stored.

Figure 6:
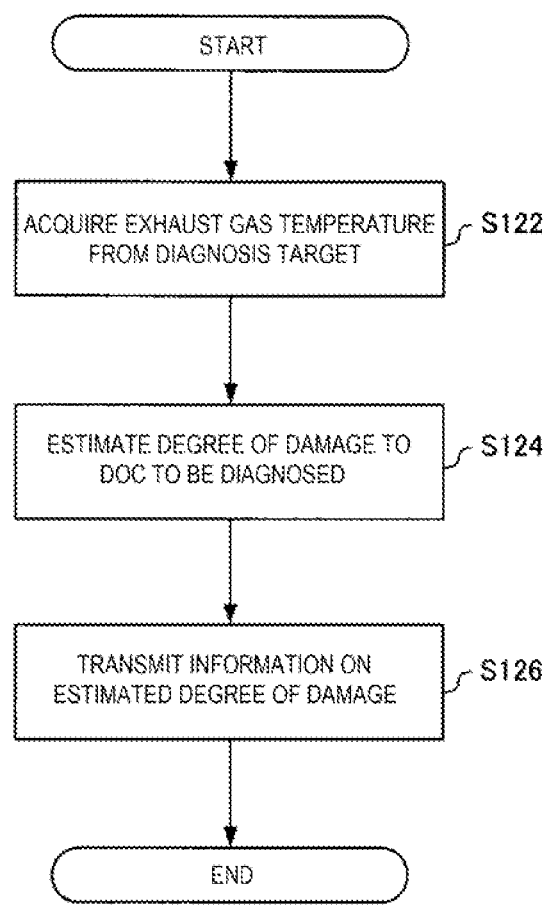
FIG. 6 is a flowchart showing estimation processing of a degree of damage to a diagnosis target.

FIG. 6 is a flowchart showing estimation processing of the degree of damage to a diagnosis target.

Here, the target information acquisition unit 125 of the management device 100 starts from the acquisition of the exhaust gas temperature from the vehicle 1 to be diagnosed (step S122). The target information acquisition unit 125 acquires, as the exhaust gas temperature, the temperature difference between the upstream temperature and the downstream temperature of the DOC 33.

Next, the diagnosis unit 126 estimates the degree of damage to the DOC 33 of the vehicle 1 to be diagnosed based on the exhaust gas temperature acquired in step S122 and the relational expression stored in advance in the storage unit 112 (step S124). For example, the diagnosis unit 126 can accurately estimate the degree of damage to the DOC 33 by obtaining the degree of damage corresponding to the exhaust gas temperature based on the relational expression shown in FIG. 4.

Next, the management device 100 transmits the information on the estimated degree of damage (step S126). For example, the management device 100 transmits the information on the degree of damage to a maintenance factory.

<Effects According to Present Embodiment>

The management device 100 according to the above-described embodiment identifies the relational expression between the degree of damage to the DOC 33 and the exhaust gas temperature using the cumulative data acquired from the plurality of vehicles 1. When the management device 100 acquires the exhaust gas temperature from the vehicle 1 to be diagnosed, the management device 100 estimates the degree of damage to the DOC 33 of the vehicle 1 to be diagnosed based on the correspondence relationship with the relational expression identified in advance.

Accordingly, by applying the exhaust gas temperature of the DOC 33 to be diagnosed to the relational expression, it is possible to appropriately estimate the degree of damage (specifically, the clogging of the front surface of the DOC 33) to the DOC 33 that deteriorates due to the plurality of stress factors. As a result, it is possible to appropriately perform maintenance of the DOC 33 or the like by providing the information on the estimated degree of damage to the maintenance factory.

Although the present disclosure has been described above using the embodiment, the technical scope of the present disclosure is not limited to the scope described in the above-described embodiment, and various modifications and changes can be made within the scope of the gist of the present disclosure. For example, all or a part of the devices can be functionally or physically distributed or integrated in any unit. Further, a new embodiment generated by any combination of a plurality of embodiments is also contained in the embodiment of the present disclosure. Effects according to the new embodiment obtained by the combination include effects according to the original embodiments.

The present application is based on the Japanese Patent Application No. 2020-033206 filed on Feb. 28, 2020, and contents thereof are incorporated herein as reference.

INDUSTRIAL APPLICABILITY

The diagnosis device and the diagnosis method according to the present disclosure are useful in that the degree of damage to the purification device can be appropriately estimated.

REFERENCE SIGNS LIST 1 vehicle
32 DPD
33 DOC
100 management device (diagnosis device)
122 data acquisition unit
123 damage degree identification unit
124 relationship identification unit
125 target information acquisition unit
126 diagnosis unit

The invention claimed is:

1. A diagnosis device comprising:
a communication unit configured to communicate with a plurality of vehicles each including an internal combustion engine and a purification device;
an acquisition unit configured to acquire, through the communication unit, from the plurality of vehicles, cumulative data for each parameter related to stress acting on the purification device configured to purify exhaust gas of the internal combustion engine and an exhaust gas temperature of the exhaust gas raised for purification;
a damage degree identification unit configured to identify a degree of damage to the purification device based on the acquired cumulative data;
a relationship identification unit configured to identify a relational expression indicating a relationship between the identified degree of damage and the exhaust gas temperature;
an exhaust gas temperature acquisition unit configured to acquire, through the communication unit from the plurality of vehicles, an exhaust gas temperature of exhaust gas raised for purification performed by the purification device from a target device which is an internal combustion engine device to be diagnosed; and
an estimation unit configured to estimate a degree of damage to the purification device of the target device based on the exhaust gas temperature of the target device acquired by the exhaust gas temperature acquisition unit and the relational expression identified by the relationship identification unit.

2. The diagnosis device according to claim 1,
wherein the estimation unit estimates a degree of damage to an oxidation catalyst for purifying particulate matter as the degree of damage to the purification device.

3. The diagnosis device according to claim 2,
wherein the exhaust gas temperature acquisition unit acquires a first temperature which is an upstream exhaust gas temperature of the oxidation catalyst, and a second temperature which is a downstream exhaust gas temperature of the oxidation catalyst, and
wherein the estimation unit estimates the degree of damage to the oxidation catalyst based on a temperature difference between the first temperature and the second temperature and the relational expression.

4. The diagnosis device according to claim 1,
wherein the damage degree identification unit identifies the degree of damage according to cumulative data of each of a plurality of stress factors deteriorating the purification device.

5. A diagnosis method comprising:
acquiring, from a plurality of vehicles each including an internal combustion engine and a purification device, cumulative data for each parameter related to stress acting on the purification device configured to purify exhaust gas of the internal combustion engine and an exhaust gas temperature of the exhaust gas raised for purification;

identifying a degree of damage to the purification device based on the acquired cumulative data;

identifying a relational expression indicating a relationship between the identified degree of damage and the exhaust gas temperature;

acquiring, from the plurality of vehicles, an exhaust gas temperature of exhaust gas raised for purification performed by the purification device from a target device which is an internal combustion engine device to be diagnosed; and estimating a degree of damage to the purification device of the target device based on the acquired exhaust gas temperature of the target device and the identified relational expression.

* * * * *